(12) United States Patent
Yazaki et al.

(10) Patent No.: US 7,031,313 B2
(45) Date of Patent: Apr. 18, 2006

(54) PACKET TRANSFER APPARATUS WITH THE FUNCTION OF FLOW DETECTION AND FLOW MANAGEMENT METHOD

(75) Inventors: Takeki Yazaki, Hachioji (JP); Yuichi Ishikawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 959 days.

(21) Appl. No.: 10/067,775

(22) Filed: Feb. 8, 2002

(65) Prior Publication Data

US 2003/0012197 A1     Jan. 16, 2003

(30) Foreign Application Priority Data

Jul. 2, 2001    (JP) ............................. 2001-200438

(51) Int. Cl.
H04L 12/28 (2006.01)
H04J 1/16 (2006.01)
G08C 15/00 (2006.01)
G06F 11/00 (2006.01)
G01R 31/08 (2006.01)

(52) U.S. Cl. .................. 370/392; 370/230; 370/389; 709/224

(58) Field of Classification Search ........ 370/229–235, 370/392–395, 401–412; 709/224–228, 245
See application file for complete search history.

(56) References Cited

U.S. PATENT DOCUMENTS 5,809,012 A * 9/1998 Takase et al. ............... 370/229
6,272,109 B1 * 8/2001 Pei et al. ..................... 370/230
6,279,035 B1 * 8/2001 Brown et al. ................ 709/224
6,768,738 B1 * 7/2004 Yazaki et al. ................ 370/392
6,788,683 B1 * 9/2004 Ikeda et al. .................. 370/389
2002/0093957 A1 * 7/2002 Yazaki et al. ............... 370/389
2003/0002438 A1 * 1/2003 Yazaki et al. ............... 370/229
2003/0043802 A1 * 3/2003 Yazaki et al. ............... 370/389

OTHER PUBLICATIONS

"A flow identification method using content addressable memory" by UGA et al. Proceeding of the 2000 IEICE General Conference, SB-4-2, p. 654.
Chapter 4.4.1 to Chapter 4.4.3 in the Traffic Management Specification Version 4.1, pp. 22–24.

\* cited by examiner

Primary Examiner—Man U. Phan
(74) Attorney, Agent, or Firm—Reed Smith LLP; Stanley P. Fisher, Esq.; Juan Carlos A. Marquez, Esq.

(57) ABSTRACT

A packet transfer apparatus having: a flow detector 30 for identifying a flow to which an input packet belongs from header information of the input packet and outputting a flow bundle identifier peculiar to the identified flow or a flow bundle identifier common to the identified flow and at least another flow; and a controller 40 having an information table 43 including a plurality of information entries corresponding to the flow bundle identifier, for reading out one of the information entries from the information table on the basis of the flow bundle identifier received from the flow detector and performing a predetermined computing process.

15 Claims, 11 Drawing Sheets

PACKET TRANSFER APPARATUS WITH THE FUNCTION OF FLOW DETECTION AND FLOW MANAGEMENT METHOD

BACKGROUND OF THE INVENTION (1) Field of the Invention

The present invention relates to a packet transfer apparatus for connecting a plurality of networks and a flow management method and, more particularly, to a packet transfer apparatus with the function of recognizing a flow of input packets and performing QoS (Quality of Service) control or accumulation of statistical information and a flow management method.

(2) Description of the Related Art

A router as a component of the IP (Internet Protocol) network has to be provided with a flow detecting function of detecting a flow to which an input packet belongs from header information of the packet. In the specification, a series of packets specified by a combination of header information of a plurality of items included in each packet header will be called a flow. The router executes QoS control, accumulation of statistical information, filtering, policy-based routing, and the like for each packet flow.

In recent years, to address sharp increase in IP traffic, flow detection at higher speed is being studied. For example, in "A flow identification method using content addressable memory" by Uga et al., proceedings of the 2000 IEICE (The Institute of Electronics, Information and Communication Engineers) General Conference, SB-4-2, there is proposed a flow identifying method using a CAM (Contents Addressable Memory) in which a plurality of flow entries describing flow identifying conditions are stored and a searched result holding table in which a plurality of searched result entries each describing a process to be performed on an input packet are stored in correspondence with each flow entry.

In the conventional technique, a flow is detected by extracting, as search key information, all of header items (fields) necessary to identify the flow from header information of an input packet and searching the CAM for a flow entry matching the search key information. The input packet is processed in accordance with the contents described in the searched result entry, which is corresponding to the flow entry and read out from the searched result holding table. As the CAM can retrieve flow entries matching the search key information at high speed irrespective of the number of flow entries registered, the flow can be identified at high speed.

A router has to be provided with, as the functions of QoS control, not only the function of bandwidth monitor for each flow but also the function of bandwidth monitor for a bundle of a plurality of flows. The router also needs the function of statistical information accumulation capable of counting the number of input packets and output packets, an accumulation value of byte lengths, and the like for each flow bundle.

For example, FIG. 2 shows a network in which sites A1, A2, and A3 belonging to a company A are connected to each other via the Internet (public IP network) 200.

The site A1 includes a gateway router 211 and terminals 212 and 213, the site A2 includes a gateway router 221 and terminals 222 and 223, and the site A3 includes a gateway router 231 and a terminal 232. The Internet 200 has an edge router 202 connected to the gateway routers 211 and 221, an edge router 203 connected to the gateway router 231, and a backbone router 201 for connecting the edge routers. Reference numeral 90 denotes a management terminal connected to the edge router 202.

A packet flow from the site A1 toward the site A3 via a communication line 206 between the gateway router 211 and the edge router 202 is defined as flow 1, and a packet flow from the site A2 toward the site A3 via a communication line 207 between the gateway router 221 and the edge router 202 is defined as flow 2.

Assuming now that the manager of the Internet 200 has a contract with the company A, of assuring the bandwidth of 10 Mbits/sec for both the flow 1 and flow 2 with respect to flows of packets transmitted from the sites A1 and A2 to the site A3, when the edge router 202 detects these two flows entering from the lines 206 and 207 and the total of the bandwidth used by the flow 1 and flow 2 exceeds the contracted bandwidth (policing rate) of 10 Mbits/sec, the edge router 202 has to execute a control such as discarding of packets or rewriting of header information to lower the transfer priority of bandwidth violation packets.

However, the flow identifying conditions of the flow 1 and flow 2 are different from each other. Consequently, in the case of employing the flow identifying method using the CAM, a first flow entry describing the identifying condition of the flow 1 and a second flow entry describing the identifying condition of the flow 2 have to be separately prepared in the CAM. In this case, since the entry address of the first flow entry and that of the second flow entry are different from each other in the CAM, a searched result entry read out from the searched result holding table in the case where the flow 1 is detected and that in the case where the flow 2 is detected are different from each other.

SUMMARY OF THE INVENTION

In order to monitor a bandwidth by employing the flow identifying method using the CAM, it is necessary to store monitored traffic parameters and history information for grasping the state of a packet flow in a searched result entry specified by the flow identification, update the history information in a searched result entry each time a packet arrives, and determine the current state of the packet flow on the basis of the traffic parameters. However, as described above, when the searched result entry in the flow 1 and that in the flow 2 are different from each other, history information in the flow 1 and that in flow 2 are also different from each other. As a result, it is difficult to monitor the bandwidth of the flow 1 and flow 2 as a bundle at once.

Also in the case of accumulating statistical information used for charging, a similar problem occurs. For example, in the case of accumulating the number of packets and transmission message lengths on the flow unit basis, a counter area is required for each flow. In order to accumulate statistical information for the flow 1 and flow 2 as a bundle, a common counter area is necessary. According to the conventional flow identifying technique using a CAM, however, an entry read out from a counter table in response to the detection of the flow 1 and that read out in response to the detection of flow 2 are different from each other, so that the counter area cannot be shared.

An object of the invention is to provide a packet transfer apparatus capable of dealing a plurality of flows as a bundle of flows.

Another object of the invention is to provide a flow management method for a packet transfer apparatus capable of monitoring bandwidth or accumulating statistical information for a bundle of plural flows.

In order to achieve the objects, the invention provides a packet transfer apparatus including: a flow detector for identifying a flow to which an input packet belongs from header information of the input packet and outputting a flow bundle identifier peculiar to the identified flow or a flow bundle identifier common to the identified flow and at least another flow; and a controller having an information table including a plurality of information entries corresponding to the flow bundle identifier, for reading out one of the information entries from the information table on the basis of the flow bundle identifier received from the flow detector and performing a predetermined computing process.

The controller executes a computing process for monitoring bandwidth of a packet flow to which the input packet belongs or accumulating statistic information of a packet flow to which the input packet belongs, on the basis of header information of the input packet and the contents of an information entry read from the information table. The flow detector includes, for example: a contents addressable memory for storing a plurality of flow entries each defining a flow identifying condition and outputting an address of a flow entry having a flow identifying condition matching header information of an input packet; and an address converter for converting the address output from the contents addressable memory into a flow bundle identifier.

A flow management method according to the invention includes: a step of identifying a flow to which an input packet belongs from header information of the input packet; a step of assigning a flow bundle identifier peculiar to the identified flow or a flow bundle identifier common to the identified flow and at least another flow; and a step of executing a predetermined computing process on the basis of the contents of an information entry prepared in correspondence with the flow bundle identifier and header information of the input packet.

The other objects to be achieved by the invention, features, and operation modes will become apparent from the following embodiments to be described with reference to the drawings.

DESCRIPTION OF THE PREFERRED EMBODIMENTS

Embodiments of the invention will be described hereinbelow with reference to the drawings. First, a router having the function of monitoring a bandwidth on a flow bundle unit basis will be described as a first embodiment of the invention.

Figure 1:
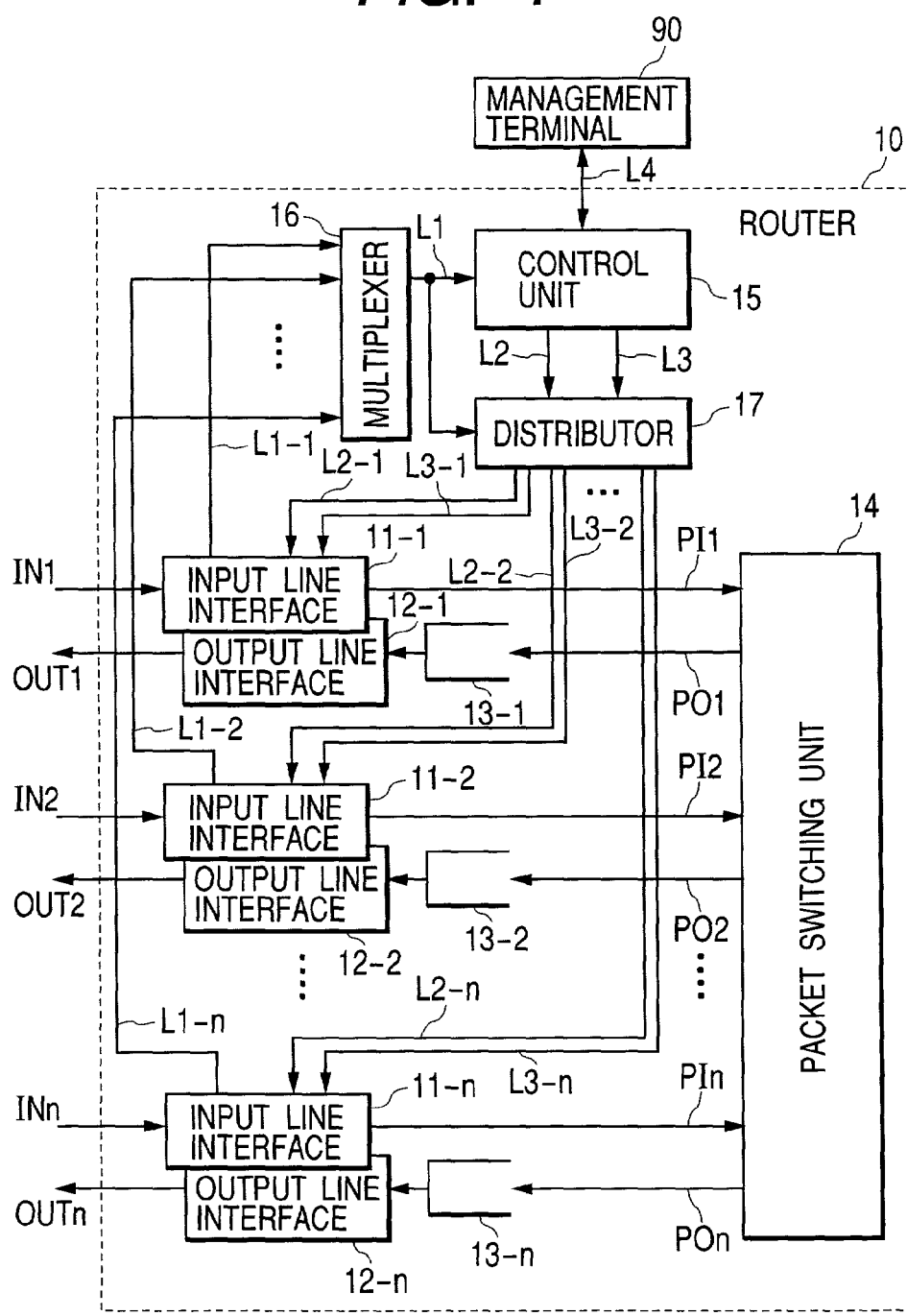
FIG. 1 is a block configuration diagram showing a router 10 according to a first embodiment of the invention.
Figure 2:
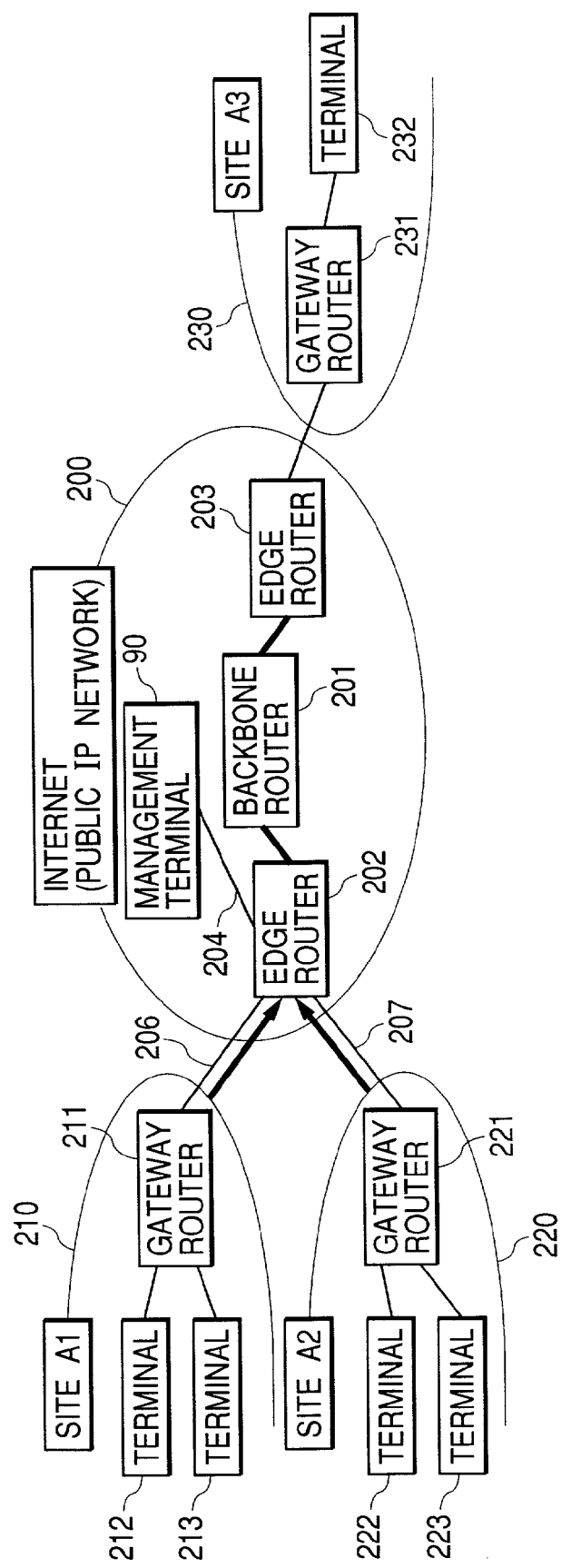
FIG. 2 is a diagram showing an example of an IP network to which the router of the invention is applied.

FIG. 1 is a block configuration diagram of a router 10 having the function of monitoring bandwidth on a flow bundle unit basis, which can be applied as the edge router 202 shown in FIG. 2.

The router 10 includes a plurality of input line interfaces 11*i* (i=1 to n) connected to input lines INi (i=1 to n), respectively, a plurality of output line interfaces 12*i* (i=1 to n) connected to output lines OUTi (i=1 to n), respectively, output buffers 13*i* (i=1 to n) provided for the output line interfaces 12*i*, respectively, a packet switching unit 14 connected to the plurality of input line interfaces 11*i* and output buffers 13*i*, a control unit 15 having the routing function of determining an output line as a transfer destination of a variable-length packet received by any one of the input line interfaces 11*i* and the function of bandwidth monitor, a multiplexer 16 for sequentially supplying packet header information output from the input line interfaces 11*i* to signal lines L1*i* (i=1 to n) to the control unit 15, and a distributor 17 for supplying an output line identifier (output line number) and a result of bandwidth monitoring output from the control unit 15 to signal lines L2 and L3 to the input line interface 11*i* as a transmission source of each of the packet header information.

As will be described hereinlater, the control unit 15 has a routing table, an address mapping table connected to a CAM, and a bandwidth monitoring table which is accessed on the basis of an output of the address mapping table. Data is set to these tables by a management terminal 90 via a signal line L4.

Figure 3:
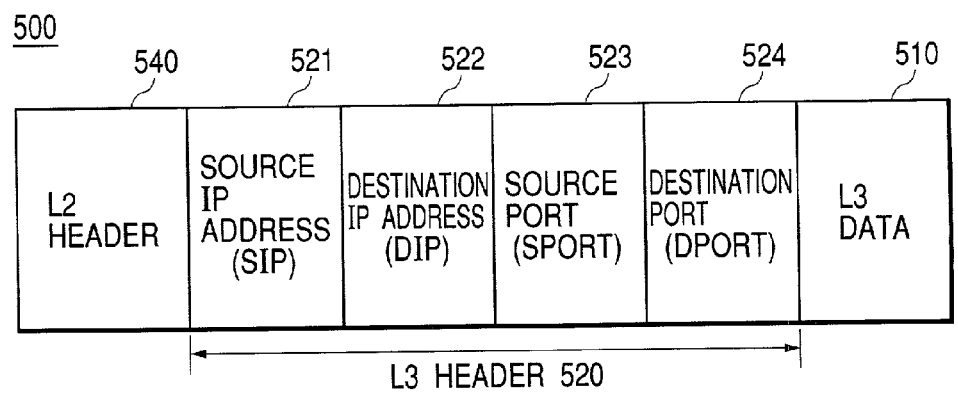
FIG. 3 is a diagram showing the format of a packet input to the router of the invention.

FIG. 3 shows an example of the format of a variable-length packet received by each of the input lines IN-i.

An input packet 500 of a variable length received by each of the input lines IN-i is constructed by an L2 header 540 which includes header information of a second layer (data link layer) in an OSI (Open System Interconnection) reference model, an L3 header 520 which includes header information of a third layer (network layer), and L3 data 510. The format of the L2 header 540 varies according to the kind of an input line. When the input line IN-i is of the Ethernet, the L2 header 540 includes a source MAC address, a destination MAC address, a packet (data) length, and other information.

When the protocol of the network layer is the IP (Internet Protocol), the L3 header 520 includes a source IP address ("SIP") 521 indicative of a source terminal of a packet, a destination IP address ("DIP") 522 indicative of a destination terminal of the packet, a service type indicative of priority of the packet, packet (data) length, and other information. For convenience of explanation of the flow identifying operation, header information in the case where the protocol of the fourth layer (transport layer) is TCP (Transmission Control Protocol) or UDP (User Datagram Protocol), for example, a source port ("SPORT") 523 indicative of a source protocol (high level application) and a destination port ("DPORT") 524 indicative of a destination protocol are also used as a part of the L3 header 520. Although the case where the protocol of the network layer is the IP will be described here, in the router 10 of the invention, the protocol of the network layer may be another protocol such as IPX.

Figure 4:
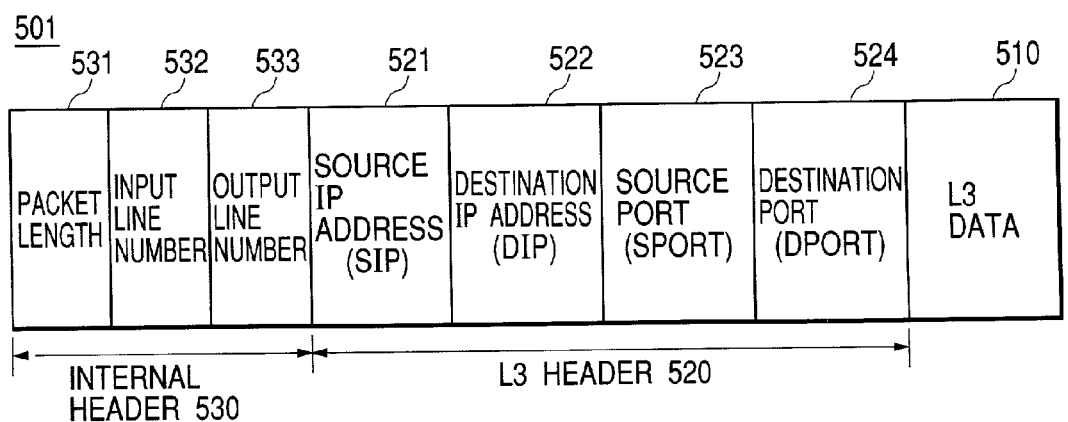
FIG. 4 is a diagram showing the format of a packet transferred within the router of the invention.

FIG. 4 shows the format of a packet in the router 10.

In the router 10, a packet 501 of the format obtained by eliminating the L2 header 540 from the input packet 500 shown in FIG. 3 and adding an internal header 530 is used. The internal header 530 includes a packet length 531 indicative of the total length of the packet, an input line number 532 indicative of the identifier of an input line of the packet, and an output line number 533 indicative of the identifier of an output line as a transfer destination of the packet. In the embodiment described hereinbelow, by using the value of the packet length 531 as the packet length of each input packet, the bandwidth of each flow is monitored.

Figure 5:
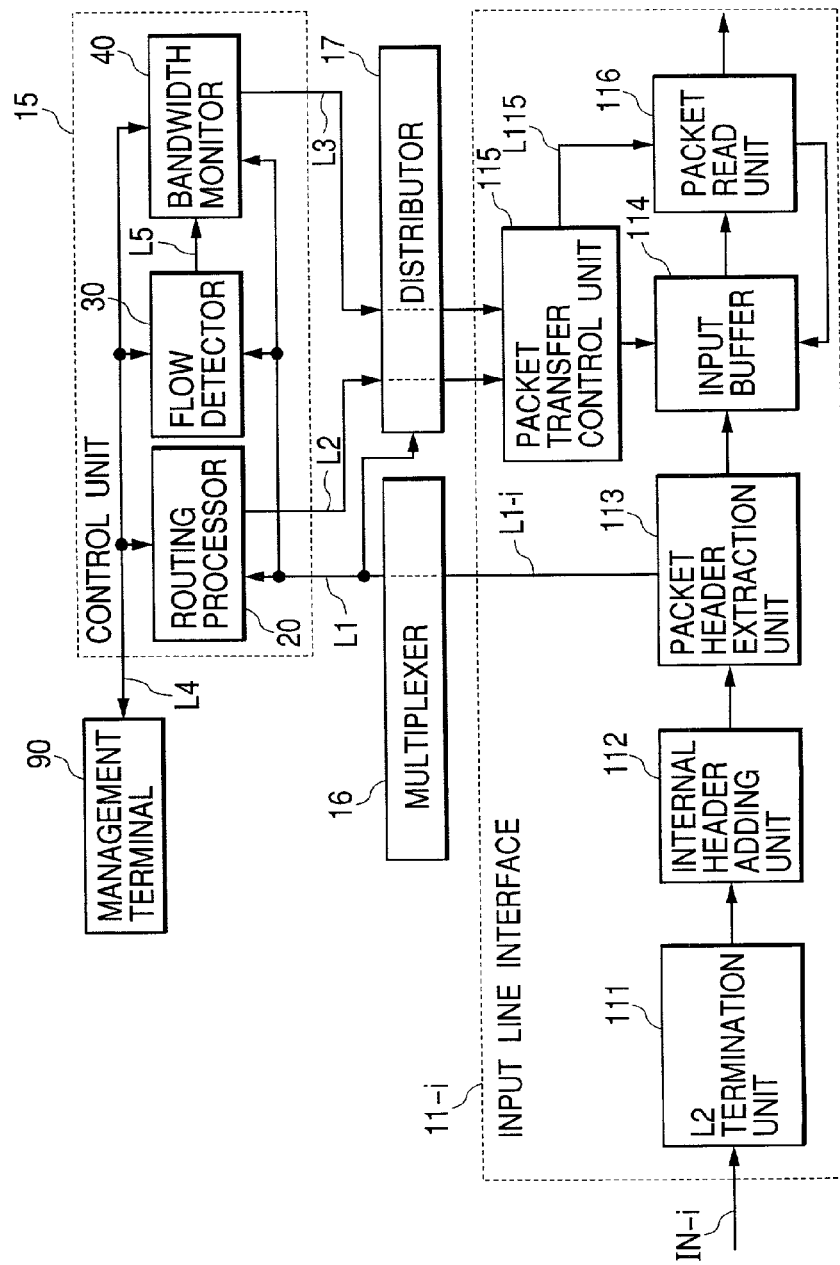
FIG. 5 is a block diagram showing the details of an input line interface 11-*i* and a control unit illustrated in FIG. 1.

FIG. 5 shows the details of the input line interface 11-$i$ and the control unit 15.

The input line interface 11-$i$ has: an L2 termination unit 111 for reproducing the input packet 500 from a received signal from the input line INi and outputting a packet obtained by terminating the data link layer and eliminating the L2 header; an internal header adding unit 112 for adding the internal header 530 to the input packet received from the L2 termination unit 111 and outputting the resultant as the internal packet 501 shown in FIG. 4; a packet header extraction unit 113 for outputting the internal packet 501 to an input buffer 114 and outputting a packet header (internal header 530 and L3 header 520) extracted from the internal packet 501 to the signal line L1-$i$; a packet transfer control unit 115 for controlling rewriting of the header information of packets accumulated in the input buffer 114 and transfer of the packet to the packet switching unit 14; and a packet read unit 116 for reading out a header-converted packet from the input buffer 114. The internal header adding unit 112 counts the byte length of an input packet received from the L2 termination unit 111 and sets the byte length as the packet length 531 of the internal header. The internal header adding unit 112 also sets the identifier or number of the input line INi preliminarily designated as the input line number 532 of the internal header and sets a nonsense value as the output line number 533.

The control unit 15 has a routing processor 20, a flow detector 30, and a bandwidth monitor 40.

The routing processor 20 has a routing table, extracts the destination IP address 522 from packet header information output from the multiplexer 16 to the signal line L1, reads out an output line identifier (output line number) pre-registered in associated with the destination IP address from the routing table, and outputs the output line identifier to the signal line L2.

The flow detector 30 specifies a flow from the packet header information and outputs the identifier or flow bundle number of a flow bundle to which the specified flow belongs to the signal line L5. As will be described hereinlater, the bandwidth monitor 40 reads out bandwidth monitor control parameters from the bandwidth monitoring table on the basis of the flow bundle identifier supplied from the signal line L5, executes a bandwidth monitoring process on the basis of the control parameters and the packet length in the packet header information received from the signal line L1, and outputs bandwidth monitor result information, which indicates whether the traffic flow of the input packet obeys the contracted bandwidth to the signal line L3.

The output line identifier (output line number) output to the signal line L2 and the bandwidth monitor result information output to the signal line L3 are input to the distributor 17. To the distributor 17, the value "i" of the input line number 532 in the packet header information output to the signal line L1 has been given as a control signal. The distributor 17 distributes the output line number and bandwidth monitor result information supplied from the signal lines L2 and L3 to the packet transfer control unit 115 in the i-th input line interface 11-$i$ specified by the value of the input line number "i".

When the bandwidth monitor result information indicates that the contracted bandwidth is obeys, the packet transfer control unit 115 writes the output line number received from the distributor 17 as the output line number 533 to the internal header of the first packet accumulated in the input buffer 114, and instructs, via a signal line L115, the packet read unit 116 to read out the first packet.

When the bandwidth monitor result information indicates that the contract bandwidth is violated, the writing of the output line number 533 and the packet reading instruction to the packet read unit 116 are omitted, and packets violating the bandwidth are discarded. When the bandwidth monitor result information indicates that the contracted bandwidth is violated, alternately, for example, an instruction of reading out violation packets may be given to the packet read unit 116 after rewriting the priority information indicated by the service type in the packet header to lower the priority of packet transfer in the Internet.

The packet transfer control unit 115 sequentially performs transfer control on packets accumulated in the input buffer by locating the read address in the input buffer to the head address of the next packet each time the packet is transferred or discarded from the input buffer 114.

In the embodiment shown in FIG. 5, the routing processor 20 is shared by the plurality of input line interfaces. However, it is also possible to dispose the routing processor 20 for each input line interface 11-$i$ and provide the control unit 15 with the flow detector 30 and the bandwidth monitor 40.

In FIG. 1, the packet switching unit 14 has input ports PIi (i=1 to n) connected to the input line interfaces 11$i$ (i=1 to n), and output ports POi (i=1 to n) connected to the output buffers 13$i$ (i=1 to n) and switches input packets received from each of the input ports PIi to an output port PIj specified by the value "j" of the output line number 533. The packet output from the output port PIj is accumulated in the transmission buffer 13-$j$, read out by the output line interface 12-$j$, and transmitted to the output line OUTj in a form that the internal header 530 is eliminated and the L2 header conformed with the protocol of the data link layer of the output line OUTj is added.

Figure 6:
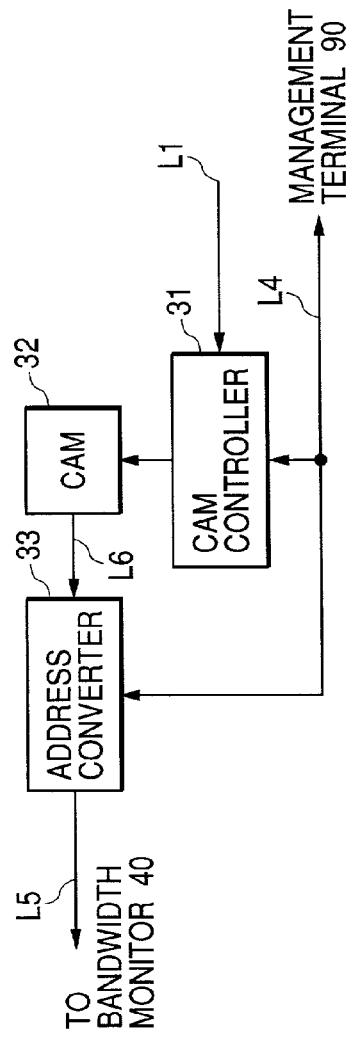
FIG. 6 is a block diagram showing the detail of a flow detector 30 illustrated in FIG. 5.

FIG. 6 is a block diagram showing the configuration of the flow detector 30.

The flow detector 30 includes a CAM controller 31, a CAM 32, and an address converter 33. In the invention, as shown in FIG. 7, flow entries EN-1 to EN-n each defining a specific combination of packet header information as a flow identifying condition are registered in the CAM 32, and a plurality of entries TE-1 to TE-n each indicative of flow bundle number in correspondence with the flow entry address in the CAM 32 are registered in an address mapping table 332 of the address converter 33.

The CAM controller 31 extracts the header information of a specific item corresponding to the flow condition from the packet header information received from the signal line L1 and accesses the CAM 32 by using the extracted header information as search key information. The CAM 32 retrieves a flow entry matching the search key information in accordance with the order starting from the flow entry EN-1 at the head and outputs the address of a flow entry EN-k having the flow identifying condition matching the search key information, which is retrieved first, to the signal line L6.

The flow entry address is input to the address converter 33 via the signal line L6, and flow bundle number "p" indicated by an entry TE-k corresponding to the flow entry address is retrieved from the address mapping table 332 and output to the signal line L5. The bundle number "p" of flows output to the signal line L5 is input to the bandwidth monitor 40.

Figure 7:
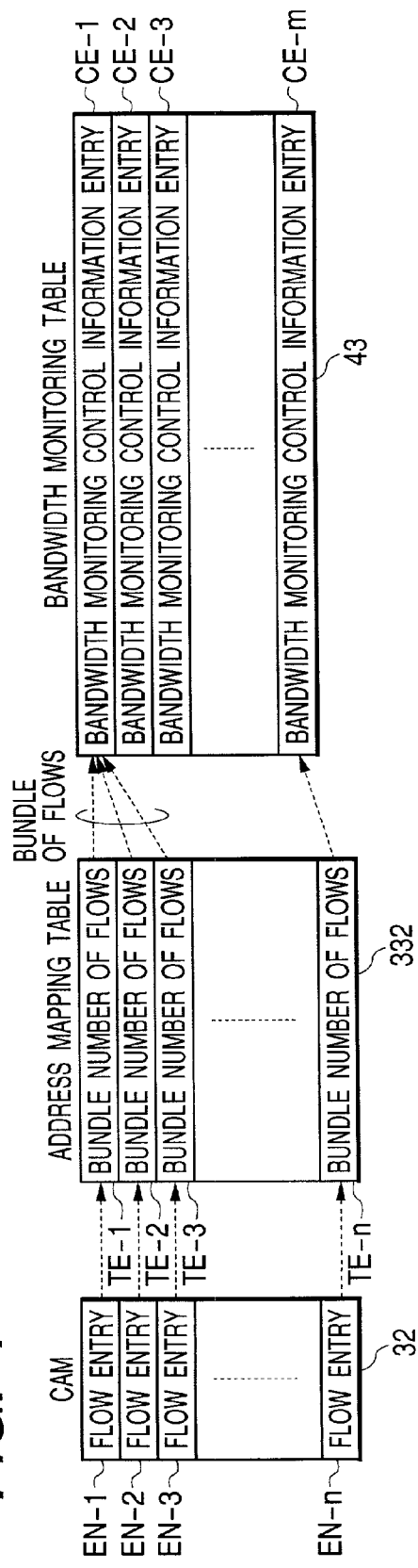
FIG. 7 is a diagram for explaining the relations among entries in a CAM 32 and an address mapping table 332 of the flow detector 30 and entries in a bandwidth monitoring table 43 of a bandwidth monitor 40 illustrated in FIG. 5.

The bandwidth monitor 40 has, as shown in FIG. 7, a bandwidth monitoring table 43 including a plurality of bandwidth monitoring control information entries CE-1 to CE-m corresponding to the flow bundle numbers, reads out the bandwidth monitoring control information entry CE-p corresponding to the flow bundle number "p" on the signal line L5 from the bandwidth monitoring table 43, and monitors the bandwidth of the input packet in accordance with control parameters shown by the bandwidth monitoring control information entry.

In the invention, the contents of each entry in the address mapping table 332 are defined so that a plurality of predesignated flows of different flow identifying conditions have the same flow bundle number. For instance, in the example shown in FIG. 7, by defining the same flow bundle number to the three entries TE-1, TE-2, and TE-3 in the address mapping table 332, the same flow bundle number is assigned to three flows identified by the flow entries EN-1, EN-2, and EN-3 of the CAM 32. Thus, the bandwidth of three flows identified by the flow entries EN-1, EN-2, and EN-3 can be monitored in accordance with the same control parameters indicated by the bandwidth monitoring control entry CE-1.

Figure 8:
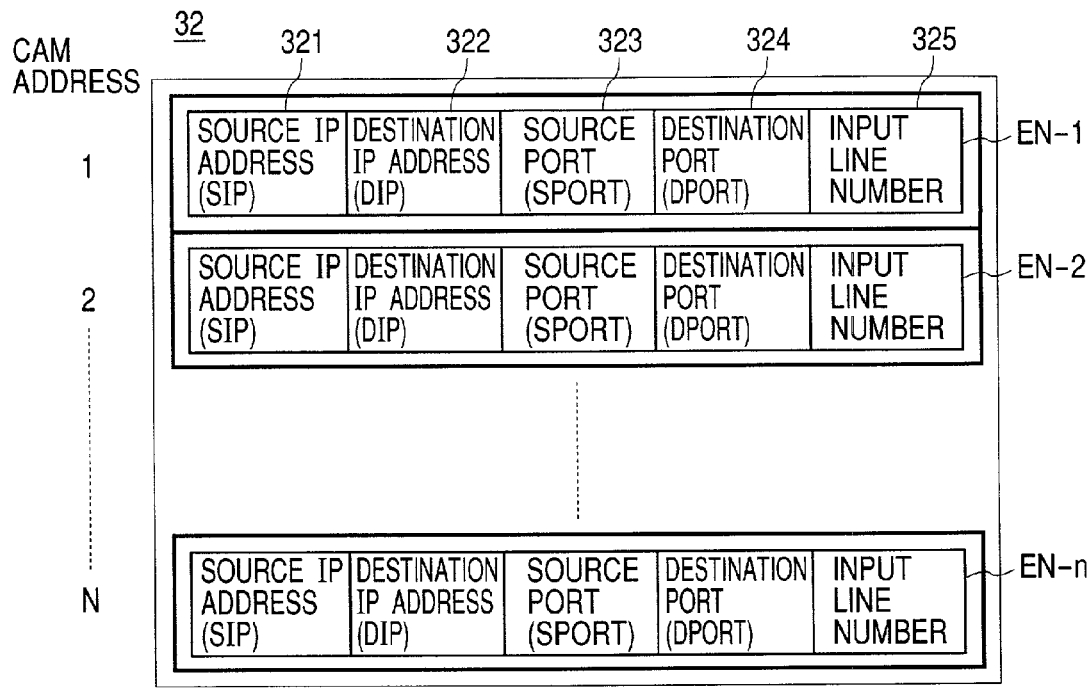
FIG. 8 is a diagram showing the format of a flow entry to be registered in the CAM 32.

FIG. 8 shows an example of the flow entry EN-i (i=1 to n) registered in the CAM 32.

In the example, each flow entry EN-i is constructed by a source IP address ("SIP") 321, a destination IP address ("DIP") 322, a source port ("SPORT") 323, a destination port ("DPORT") 324, and an input line number 325 which are included in the packet header information. According to a combination of these items, the flow identifying condition is defined.

These flow entries are set to the CAM 32 by the manager of the router 10 from the management terminal 90. When a control message including a CAM write command, the address in the CAM 32, and write data (the contents of the entry) is transmitted from the management terminal 90 to the signal line L4, the CAM controller 31 receives the control message and writes the data into the designated address in the CAM. When the packet header information is received from the signal line L1, the CAM control unit 31 extracts the SIP 521, DIP 522, SPORT 523, DPORT 524, and input line number 532 as the above-described flow identifying conditions and gives the extracted data as a flow search key to the CAM 32.

Figure 9:
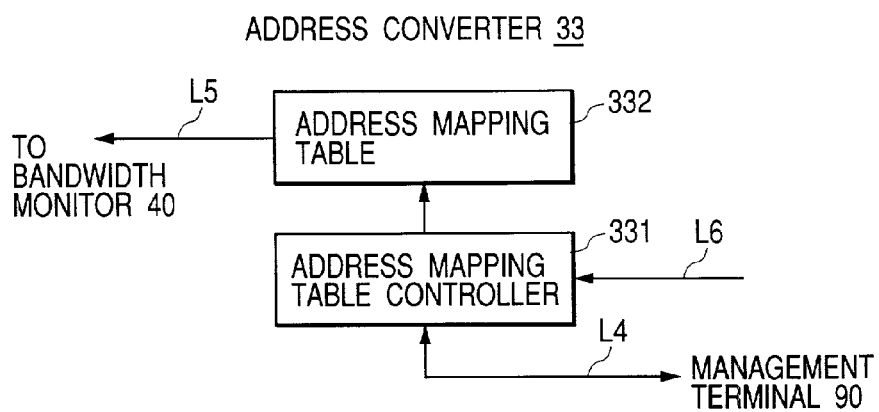
FIG. 9 is a block diagram specifically showing an address converter 33 illustrated in FIG. 6.

FIG. 9 is a block diagram showing the configuration of the address converter 33.

The address converter 33 has an address mapping table controller 331 and an address mapping table 332. When the flow entry address is received from the signal line L6, the address mapping table controller 331 accesses the address mapping table 332 by using the address as a read address. In a manner similar to the case of the CAM 32, the entries (flow bundle numbers) TE-1 to TE-n are set into the address mapping table 332 by the management terminal 90. When a control message including a command of writing to the address mapping table, a table address and write data (flow bundle number) is transmitted from the management terminal 90 to the signal line L4, the address mapping table controller 331 receives the control message and writes the flow bundle number into a designated address in the address mapping table 332.

The configuration and operation of the bandwidth monitor 40 will now be described.

In this embodiment, a modified leaky bucket algorithm is applied as a bandwidth monitoring algorithm. The modified leaky bucket algorithm is obtained by changing a conventional continuous state leaky bucket algorithm known as a technique of measuring the bandwidth of a packet flow for each connection in the field of a fixed length packet connection network typified by an ATM (Asynchronous Transfer Mode) network to an algorithm for a variable-length packet network. The leaky bucket algorithm is described in, for example, chapter 4.4.2 in "The ATM Forum Specification Version 4.1".

In the conventional leaky bucket algorithm, the bandwidth of a packet flow is modeled on an accumulated water quantity of a holed bucket (leaky bucket) having a certain depth prepared for each connection. Into the leaky bucket, each time a cell of the connection arrives, water of the quantity corresponding to one cell is poured, and accumulated water in the leaky bucket continuously leaks at a predetermined rate proportional to the contracted bandwidth of each connection.

In order to permit transmission of cells belonging to the same connection in a burst manner within a range, a permissible accumulation water quantity is predetermined for the leaky bucket. When cells belonging to the same connection frequency arrive, the quantity of water poured into the leaky bucket becomes larger than the leaked water quantity, so that the waver level in the bucket goes up. In the leaky bucket algorithm, as long as water does not overflow from the leaky bucket, it is estimated that the contracted bandwidth is obeyed. When water overflows from the leaky bucket, it is determined that an excessive cell flow (traffic) which violates the contracted bandwidth occurs. In the embodiment, by making the quantity of water poured into the leaky bucket variable on arrival of a packet in accordance with the packet length, the bandwidth of the variable-length packet can be monitored by using the leaky bucket.

Figure 10:
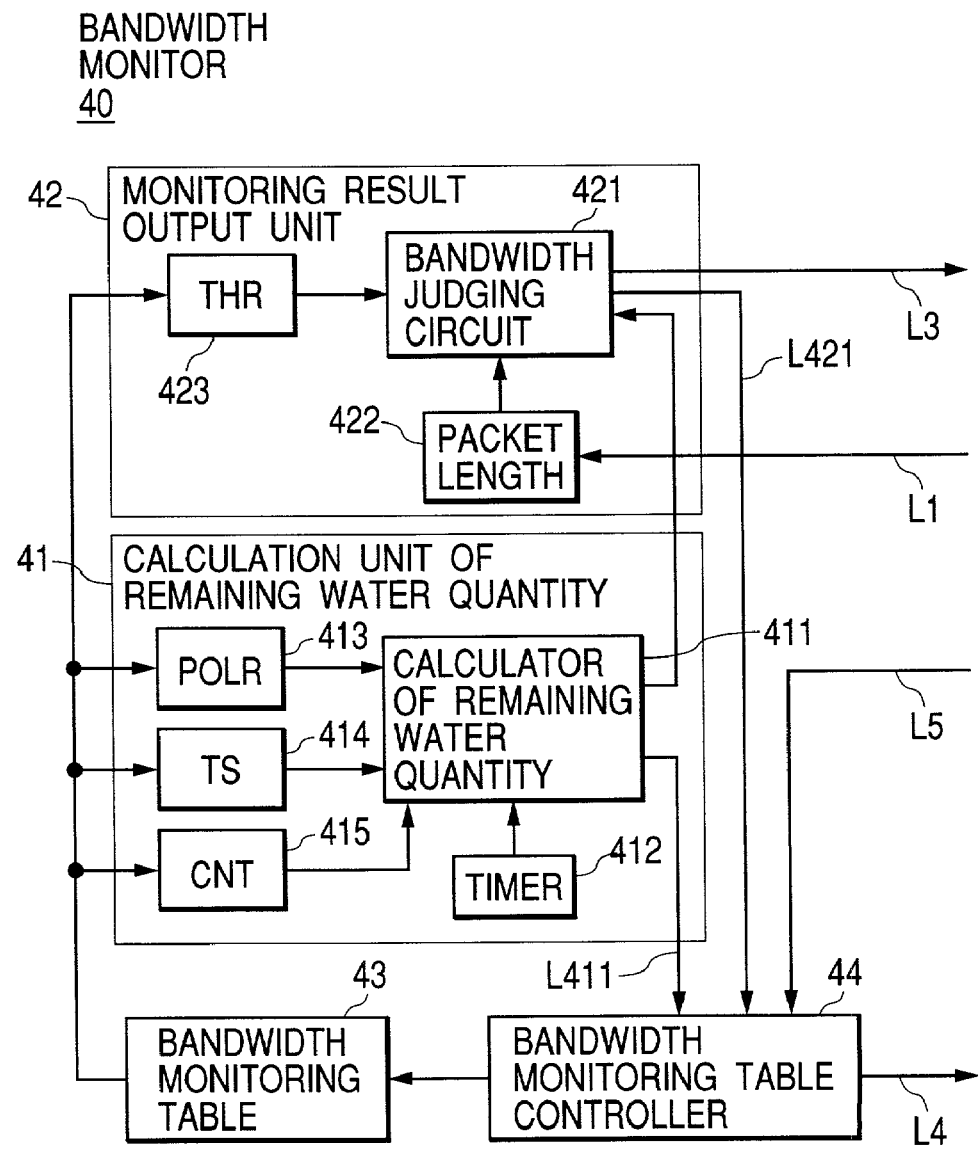
FIG. 10 is a block diagram showing an example of the bandwidth monitor 40 illustrated in FIG. 5.

FIG. 10 is a block diagram showing the configuration of the bandwidth monitor 40.

The bandwidth monitor 40 has a calculation unit 41 of remaining water quantity for calculating the quantity of remaining water in the leaky bucket corresponding to the flow bundle number, a monitoring result output unit 42 for determining whether a packet flow rate obeys the contracted bandwidth or not and outputting a determination result, a bandwidth monitoring table 43, and a bandwidth monitoring table controller 44 for reading out one bandwidth monitoring control information entry corresponding to the flow bundle number from the bandwidth monitoring table 43.

Figure 11:
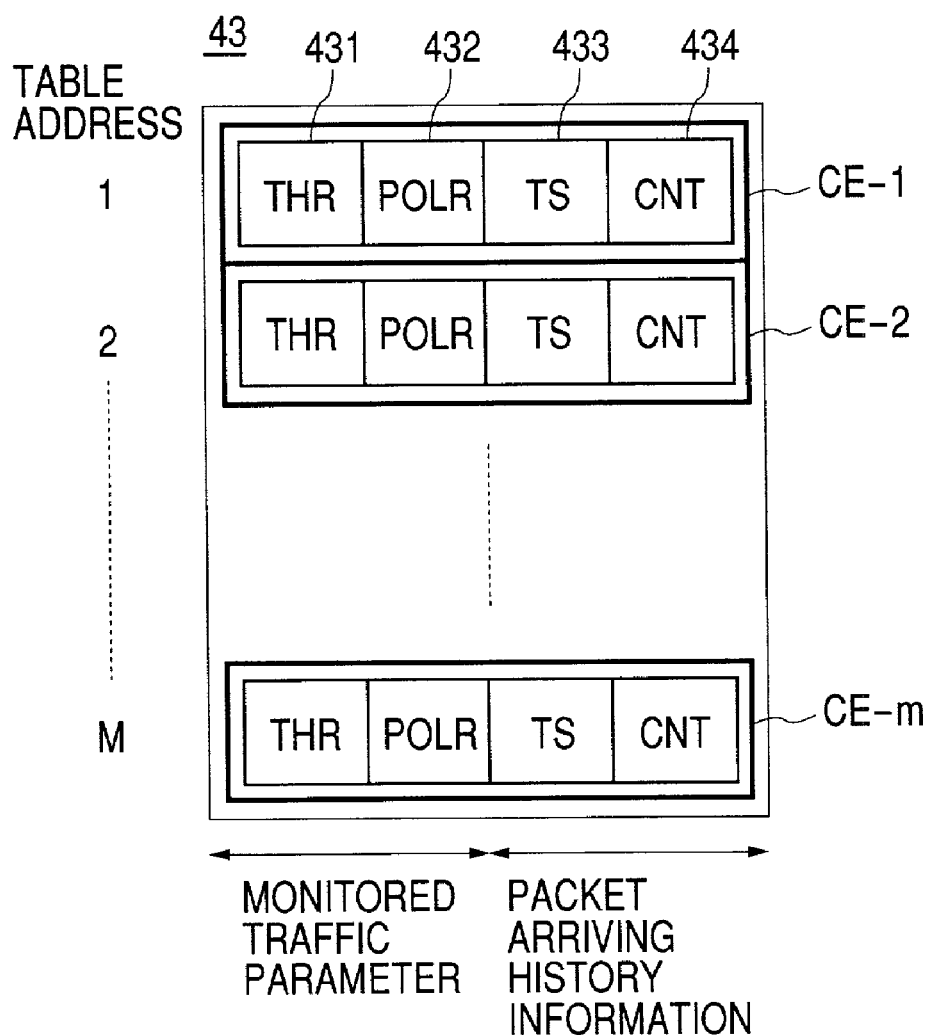
FIG. 11 is a diagram showing the format of an entry in the bandwidth monitoring table 43 of the bandwidth monitor 40.

FIG. 11 shows the configuration of the bandwidth monitoring table 43.

The bandwidth monitoring table 43 includes "m" pieces (m≦n where n denotes the number of flow entries in the CAM 32) of bandwidth monitoring control information entries CE-i (i=1 to m) corresponding to the flow bundle numbers output from the flow detector 30 to the signal line L5. Each bandwidth monitoring control information entry CE-i is constructed by a monitored traffic parameter indicative of the parameters of a packet flow bundle (traffic) to be monitored and packet arriving history information indicative of arriving history of packets.

Each bandwidth monitoring control information entry CE-i includes, as monitored traffic parameters, for example, a threshold value ("THR" byte) 431 corresponding to the depth of the bucket, which is determined by the burst tolerance, and a contracted bandwidth (policing rate: "POLR" byte/sec) 432 corresponding to the leak rate of water from the bucket and, as packet arriving history information, a time stamp ("TS" sec) 433 indicative of the time stamp of a preceding packet in the same packet flow bundle and a count value ("CNT" byte) 434 indicative of quantity of water accumulated in the bucket, which is calculated on bandwidth monitoring of last time in the same packet flow bundle.

In the embodiment, the calculation unit 41 of remaining water quantity has a timer 412 indicative of present time (sec), a POLR storing register 413, a TS storing register 414, a CNT storing register 415, and a calculator 411 of remaining water quantity connected to the elements 412, 413, 414, and 415. The monitoring result output unit 42 has a packet length storing register 422, a THR storing register 423, and a bandwidth determining circuit 421 for determining the presence or absence of violation of the contracted bandwidth from the contents of the registers 422 and 423. In the registers 413, 414, 415, and 423, respectively, the values of POLR 432, TS 433, CNT 434, and THR 431 shown by the bandwidth monitoring control information entry read out from the bandwidth monitoring table 43 in correspondence with the flow bundle number received from the signal line L4 are set by a bandwidth monitoring table controller 44.

Figure 12:
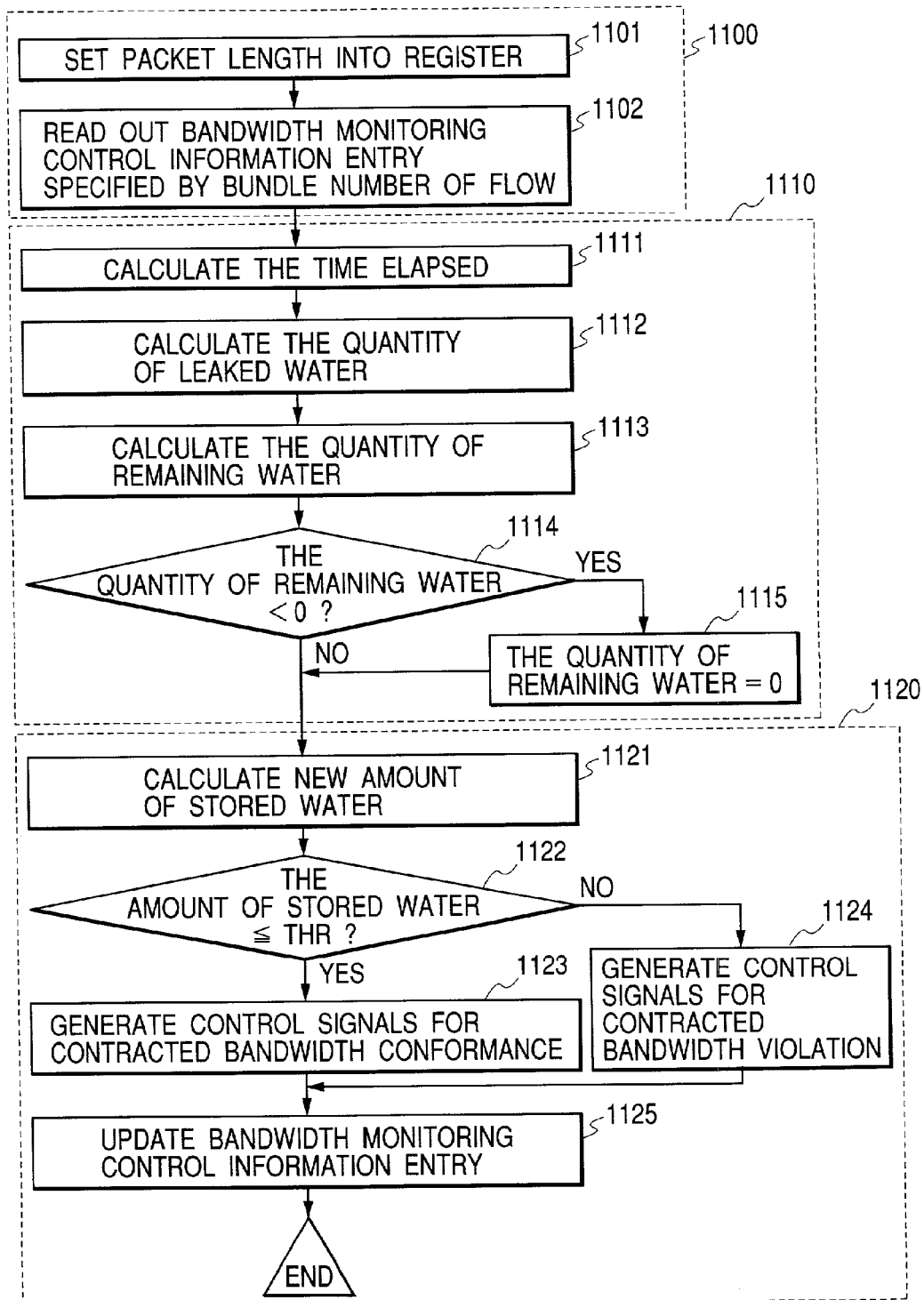
FIG. 12 is a flowchart showing the operation of the bandwidth monitor 40.

FIG. 12 is a flowchart showing the operations of the bandwidth monitor 40.

The operations of the bandwidth monitor 40 are roughly divided into a starting process 1100, a remaining water quantity calculating process 1110, and a determining process 1120. The processes 1110 and 1120 correspond to the operations of the calculation unit 41 of remaining water quantity and the monitor result output unit 42, respectively.

On receipt of packet header information from the signal line L1, the bandwidth monitor 40 stores the packet length 531 extracted from the packet header information into the packet length storing register 422 in the monitoring result output unit 42 (step 1101) When the flow bundle number "p" is received from the signal line L5, the bandwidth monitoring table controller 44 reads out a bandwidth monitoring control information entry CE-p corresponding to the flow bundle number "p" from the bandwidth monitoring table 43 and sets the values of the POLR 432, TS 433, CNT 434, and THR 431 indicated by the bandwidth monitoring control information entry CE-p into the registers 413, 414, 415, and 423, respectively (step 1102).

The calculator 411 of remaining water quantity as the main component of the calculation unit 41 of remaining water quantity captures current time from the timer 412 and calculates elapsed time (sec) since a determining process of the last time in the bundle of flows to which the packet to be determined belongs from the difference between the current time and arrival time of the preceding packet indicated by the register 414 (step 1111). By multiplying the elapsed time with the value of the monitoring bandwidth indicated by the POLR storing register 413, the quantity of water leaked from the bucket during the elapsed time is calculated (step 1112). By subtracting the leaked water quantity from the bucket accumulation water quantity CNT 434 of last time indicated by the CNT storing register 415, the quantity of water remaining in the bucket just before the packet to be determined of this time arrives is calculated (step 1113). The calculator 411 of remaining water quantity determines whether the quantity of water remaining in the bucket is positive or negative (step 1114). When the quantity of water remaining in the bucket is negative, the calculator 411 of remaining water quantity sets the value of the quantity of water remaining in the bucket to the initial value of 0 (step 1115) and, after that, notifies the bandwidth determining circuit 421 of the quantity of water remaining in the bucket. At this time, the value of present time used in step 1111 is notified as new time stamp TS from the calculator 411 of remaining water quantity to the monitoring bandwidth table controller 44 via the signal line L411.

When the quantity of water remaining in the bucket is received from the calculator 411 of remaining water quantity, the bandwidth determining circuit 421 calculates the quantity of water accumulated in the bucket immediately after a new packet arrives by adding the value of the packet length (byte) 531 indicated by the packet length storing register 422 to the quantity (byte) of water remaining in the bucket (step 1121). The bandwidth determining circuit 421 compares the quantity of water accumulated in the bucket with the threshold THR 431 indicated by the register 423 (step 1122).

When the quantity of water accumulated in the bucket exceeds the threshold value THR, the bandwidth determining circuit 421 outputs a violation signal indicative of violation of the contracted bandwidth to the signal line L3 and outputs the value of the quantity of water remaining in the bucket as the quantity of water accumulated in the packet before the packet length is added to the signal line L421 (step 1124). If the quantity of water accumulated in the bucket does not exceed the threshold THR, the bandwidth determining circuit 421 outputs a conformance signal indicating that the contracted bandwidth is obeyed to the signal line L3 and outputs the value of the quantity of water accumulated in the bucket after the packet length is added, to a signal line 421 (step 1123).

When the value of either the quantity of water accumulated in the bucket or the quantity of water remaining in the bucket is received from the signal line L421, the bandwidth monitoring table controller 44 writes the value into the CNT 434 in the bandwidth monitoring control information entry CE-p and writes time stamp TS already received via the signal line L411 to the TS 434 in the bandwidth monitoring control information entry CE-p (step 1125).

With the configuration of the router of the embodiment, the bandwidths of a plurality of flows can be monitored in the lump. Therefore, when the router 10 of the invention is used as the edge router 202 in FIG. 2, by setting flow entries for identifying packet flows at the site A1 input from the line 206 and flow entries for identifying packet flows at the site A2 input from the line 207 in the CAM 32 and defining the same flow bundle number to the two entries in the address mapping table 332 accessed with the flow entry addresses, the two flows can be combined into one flow bundle. By defining the total value of the contracted bandwidths of the two flows as the POLR 432 in the bandwidth monitoring control information entry corresponding to the flow bundle number prepared in the bandwidth monitoring table 43, the bandwidths of the packet flows input from the different lines 206 and 207 can be monitored as a group.

As a second embodiment of the packet transfer apparatus according to the invention, a router having the function of accumulating statistical information on a flow bundle unit basis will be described.

A router of the second embodiment has the statistical information accumulating function of combining a plurality of packet flows input from different input circuits into one flow bundle and calculating the number of packets or bytes of each flow on a flow bundle unit basis. The configuration of the control unit 15 is different from that in the first embodiment.

Figure 13:
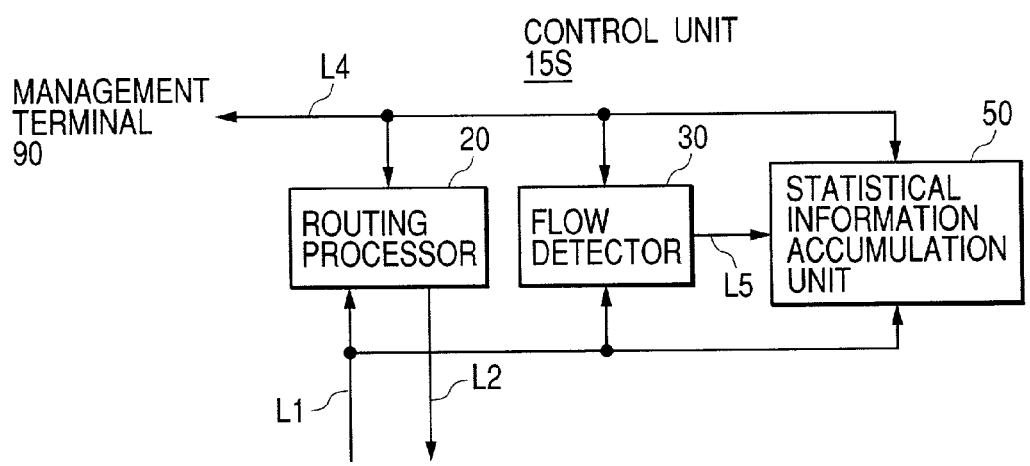
FIG. 13 is a block diagram showing the configuration of a control unit 15S of a router 10 according to a second embodiment of the invention.

FIG. 13 shows the configuration of a control unit 15S of the router 10 having the function of accumulating statistical information on the flow bundle unit basis. This configuration is different from that of the embodiment shown in FIG. 5 with respect to the point that the bandwidth monitor 40 is replaced with a statistical information accumulation unit 50.

Figure 14:
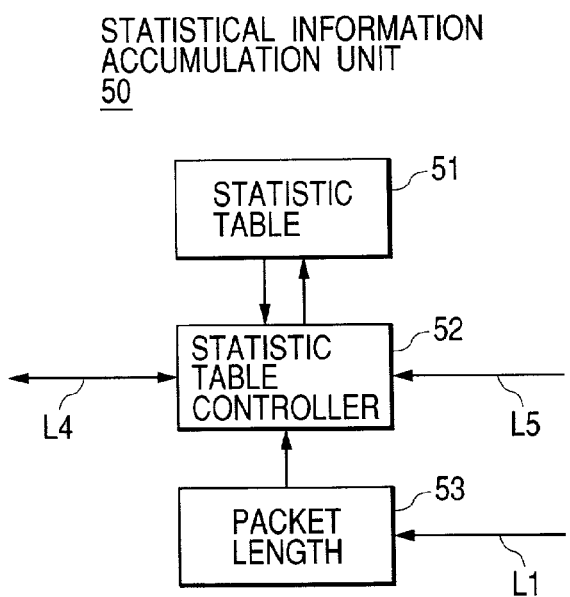
FIG. 14 is a block diagram specifically showing a statistical information accumulation unit 50 illustrated in FIG. 13.
Figure 15:
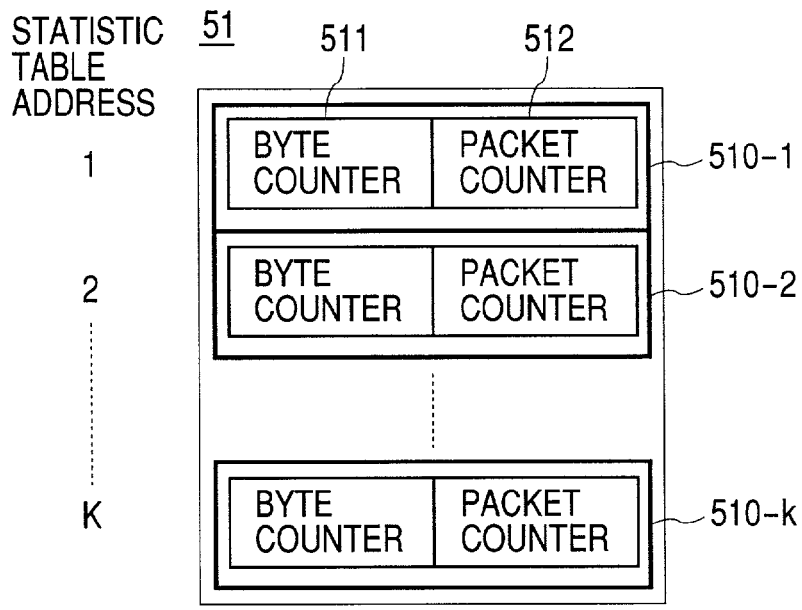
FIG. 15 is a diagram showing the format of an entry in a statistic table 51 illustrated in FIG. 14.

The statistical information accumulation unit 50 has, for example, as shown in FIG. 14, a statistic table 51 for storing statistical information, a statistic table controller 52, and a packet length storing register 53. In the register 53, a packet length 531 extracted from the packet header information received from the signal line L1 is set. The statistic table 51 includes, for example, as shown in FIG. 15, a plurality of statistic information entries 510-$i$ (i=1 to k) corresponding to flow bundle numbers. Each statistic information entry 510-$i$ comprises of byte counter 511 indicative of the sum of packet lengths (bytes) of input packets belonging to the flow bundle and a packet counter 512 indicative of the number of input packets.

When the flow bundle number "p" output from the flow detector 30 to the signal line L5 is received, the statistic table controller 52 reads out the statistic information entry 510-$p$ corresponding to the flow bundle number "p" from the statistic table 51, adds a packet length set in the register 53 to the value indicated by the byte counter 511, adds "1" to the value indicated by the packet counter 512, and writes the updated statistic information entry 510-$p$ to the statistic table 51. The contents of the statistic table 51 are loaded to the signal line L4 via the statistic table controller 52 in response to a control message output from the management terminal 90 to the signal line L4.

Figure 16:
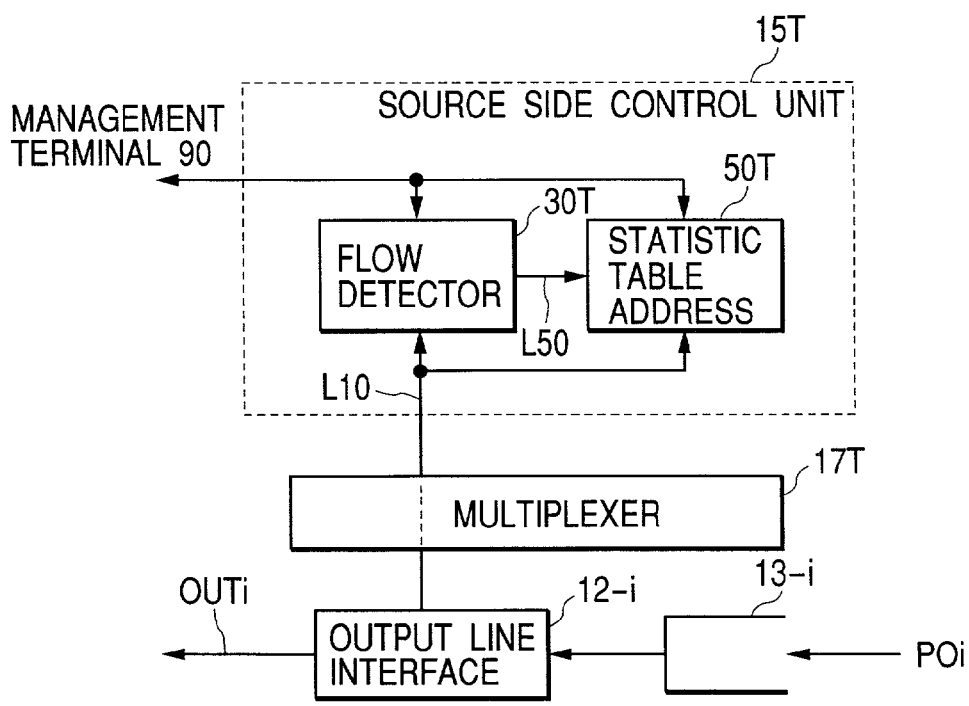
FIG. 16 is a block diagram showing the main components of the router 10 according to a third embodiment of the invention.

FIG. 16 shows main components of a router having the function of accumulating statistic information on the flow bundle unit basis from an output packet in the packet transfer apparatus according to a third embodiment of the invention.

In the router of the third embodiment, each of the output line interfaces 12-$i$ (i=1 to n) extracts packet header information constructed by the internal header 530 and the L3 header 520 from an output packet and outputs the extracted information to the signal line L10-$i$. The packet header information output to the signal line L10-$i$ is output to the signal line L10 via a multiplexer 17T and input to a transmission-side controller 15T.

The transmission-side controller 15T has a flow detector 30T and a statistical information accumulation unit 50T. The flow detector 30T has the function similar to that of the flow detector 30 of the second embodiment shown in FIG. 13 and outputs a flow bundle number retrieved on the basis of packet header information received from the signal line L10 to the signal line L50. The statistical information accumulation unit 50T has the function similar to that of the statistical information accumulation unit 50 of the second embodiment shown in FIG. 13 and updates the contents of a statistic information entry in a statistic table on the basis of packet length 531 extracted from packet header information output to the signal line L10 and the flow bundle number received from the signal line L50.

In the foregoing first and second embodiments, all the input line interfaces 12-$i$ (i=1 to n) connected to the packet switching unit 14 are coupled to the control unit 15 via the multiplexer 16 and the distributor 17. As a modification of the invention, it is also possible to divide the input line interfaces 11-$i$ (i=1 to n) into a plurality of groups and dispose the control unit 15 for each of the groups.

As further another modification of the invention, the control unit 15 having the function of monitoring the bandwidth on the flow bundle unit basis or the statistical processing function may be provided for each of the input line interfaces. In this case, although a plurality of flows of different input lines cannot be dealt in a bundle, in a manner similar to the first and second embodiments, the bandwidth monitoring or the statistical process on the flow bundle unit basis can be performed on the plurality of flows multiplexed on the same input line.

As obviously understood from the above embodiments, according to the invention, a plurality of flows of different flow identifying conditions can be dealt as a bundle of flows, so that the packet transfer apparatus having the function of bandwidth monitor or the statistical processing function on the flow bundle unit basis can be provided.

What is claimed is:

1. A packet transfer apparatus connected to a plurality of input lines and a plurality of output lines, for transferring an input packet received from any one of the input lines to one of the output lines specified by header information of the received packet, comprising:

a flow detector for identifying a flow to which an input packet belongs from header information of the input packet and outputting a flow bundle identifier peculiar to the identified flow or a flow bundle identifier common to the identified flow and at least another flow; and a controller having an information table including a plurality of information entries corresponding to the flow bundle identifier, for reading out one of the information entries from said information table on the basis of the flow bundle identifier received from said flow detector and performing a predetermined computing process.

2. The packet transfer apparatus according to claim 1, further comprising a plurality of input line interfaces connected to said input lines and having the function of adding an internal header including at least an input line number to each input packet, wherein said flow detector identifies a flow to which the input packet belongs on the basis of header information of the input packet including said internal header.

3. The packet transfer apparatus according to claim 1, wherein said controller executes a computing process for monitoring bandwidth of a packet flow to which the input packet belongs on the basis of header information of the input packet and the contents of an information entry read out from said information table.

4. The packet transfer apparatus according to claim 1, wherein said controller executes a computing process for accumulating statistic information of a packet flow to which the input packet belongs on the basis of header information of the input packet and the contents of an information entry read out from said information table.

5. The packet transfer apparatus according to claim 1, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

6. The packet transfer apparatus according to claim 2, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

7. The packet transfer apparatus according to claim 3, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

8. The packet transfer apparatus according to claim 4, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

9. A packet transfer apparatus having a plurality of input line interfaces connected to input lines, a plurality of output line interfaces connected to output lines, and a packet switching unit for transferring input packets received by said input line interfaces to one of said output line interfaces specified by header information of each of said input packets, comprising:

a flow detector for receiving header information of an input packet from each of said input line interfaces, identifying a flow to which said input packet belongs from the header information received, and outputting a flow bundle identifier peculiar to the identified flow or a flow bundle identifier common to the identified flow and at least another flow; and a controller having an information table including a plurality of information entries corresponding to flow bundle identifiers, for reading out one of the information entries from said information table on the basis of the flow bundle identifier received from said flow detector and performing a predetermined computing process.

10. The packet transfer apparatus according to claim 9, wherein said controller executes a computing process for monitoring bandwidth of a packet flow to which said input packet belongs on the basis of header information of the input packet and the contents of an information entry read out from said information table, and notifies a monitoring result to an input line interface which has sent said header information.

11. The packet transfer apparatus according to claim 9, wherein said controller executes a computing process for accumulating statistic information of a packet flow to which said input packet belongs on the basis of header information of the input packet and the contents of an information entry read out from said information table.

12. The packet transfer apparatus according to claim 9, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

13. The packet transfer apparatus according to claim 10, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

14. The packet transfer apparatus according to claim 11, wherein said flow detector comprises:

a contents addressable memory for storing a plurality of flow entries each defining a flow identifying condition and outputting an address of a flow entry having a flow identifying condition matching header information of an input packet; and an address converter for converting the address output from said contents addressable memory into a flow bundle identifier.

15. A flow management method comprising the steps of:

identifying a flow to which an input packet belongs from header information of the input packet;

assigning a flow bundle identifier peculiar to the identified flow or a flow bundle identifier common to the identified flow and at least another flow; and executing a predetermined computing process on the basis of the contents of an information entry prepared in correspondence with the flow bundle identifier and header information of said input packet.

* * * * *